US009432905B2

(12) United States Patent
Siomina et al.

(10) Patent No.: US 9,432,905 B2
(45) Date of Patent: *Aug. 30, 2016

(54) METHOD AND APPARATUS FOR HANDLING A CELL CHANGE

(71) Applicant: Telefonaktiebolaget L M Ericsson (publ), Stockholm (SE)

(72) Inventors: Iana Siomina, Solna (SE); Muhammad Kazmi, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/848,693

(22) Filed: Sep. 9, 2015

(65) Prior Publication Data

US 2015/0382271 A1    Dec. 31, 2015

Related U.S. Application Data

(63) Continuation of application No. 13/503,646, filed as application No. PCT/SE2012/050351 on Mar. 29, 2012, now Pat. No. 9,173,150.

(60) Provisional application No. 61/499,689, filed on Jun. 21, 2011.

(51) Int. Cl.
*H04W 36/04* (2009.01)
*H04W 36/30* (2009.01)
(Continued)

(52) U.S. Cl.
CPC ............... *H04W 36/32* (2013.01); *G01S 5/06* (2013.01); *H04W 36/04* (2013.01); *H04W 36/30* (2013.01); *H04W 36/36* (2013.01); *H04W 36/38* (2013.01); *H04W 64/00* (2013.01); *H04W 84/042* (2013.01)

(58) Field of Classification Search
None
See application file for complete search history.

(56) References Cited

U.S. PATENT DOCUMENTS 6,385,454 B1    5/2002 Bahl et al.
7,002,489 B1    2/2006 Denker et al.
(Continued)

FOREIGN PATENT DOCUMENTS

EP    2 207 369 A1    7/2010
WO    2004/062178 A2    7/2004
(Continued)

OTHER PUBLICATIONS

International Search Report issued in corresponding International Application No. PCT/SE2012/050351, date of mailing Sep. 12, 2012.
(Continued)

*Primary Examiner* — Omar Ghowrwal
(74) *Attorney, Agent, or Firm* — Patent Portfolio Builders PLLC

(57) ABSTRACT

Example embodiments presented herein are directed towards a user equipment, and corresponding methods therein, for handling a cell change from a first cell to a second cell in a wireless communications network. Some example embodiments may also be directed towards the user equipment altering a duration of a measurement time over which at least one measurement is performed, and altering a measurement bandwidth of the at least one measurement. The alterations may be performed based on associated bandwidths of the first and second cells. Other example embodiments may be directed towards a network node, and corresponding method therein, for sending, to the user equipment, a notification of a cell change and information associated with the cell change. Example embodiments may further comprise the network node receiving measurement data of at least one measurement performed over an altered measurement bandwidth and an altered duration of measurement time, where the alterations are based on the information associated with the cell change.

12 Claims, 7 Drawing Sheets

(51) Int. Cl.
*H04W 36/36* (2009.01)
*H04W 36/32* (2009.01)
*G01S 5/06* (2006.01)
*H04W 36/38* (2009.01)
*H04W 64/00* (2009.01)
*H04W 84/04* (2009.01)

(56) References Cited

U.S. PATENT DOCUMENTS

| | | | |
|---|---|---|---|
| 9,055,595 B2* | 6/2015 | Siomina | G01S 5/0205 |
| 9,173,150 B2* | 10/2015 | Siomina | H04W 36/30 |
| 2009/0075647 A1 | 3/2009 | Lindoff et al. | |

FOREIGN PATENT DOCUMENTS

| | | |
|---|---|---|
| WO | 2008/097185 A2 | 8/2008 |
| WO | 2011/039930 A1 | 4/2011 |
| WO | 2012/173561 A2 | 12/2012 |

OTHER PUBLICATIONS

Written Opinion of the International Searching Authority issued in corresponding International Application No. PCT/SE2012/050351, date of mailing Sep. 12, 2012.
NTT DoCoMo, Discussions on Measurement Bandwidth for Inter-frequency measurement, 3GPP Draft, 3rd Generation Partnership Project (3GPP), Mobile Competence Centre; 650, Route des Lucioles, F-06921 Sophia-Antipolis Cedex, France, R4-070746, TSG-RAN Working Group 4 Meeting #43, Kobe, Japan, May 7-11, 2007, pp. 1-2, XP050177217.
3GPP Draft, 3rd Generation Partnership Project, Technical Specification Group Radio Access Network; Evolved Universal Terrestrial Access (E-UTRA); Requirements for support of radio resource management (Release 9), 3GPP TS 36.133 V9.6.0. Dec. 2010.
3GPP, 3rd Generation Partnership Project, Technical Specification Group Radio Access Network; Evolved Universal Terrestrial Access (E-UTRA); Physical layer; Measurements (Release 9), 3GPP TS 36.214 V9.2.0. Jun. 2010.
3GPP, 3rd Generation Partnership Project, Technical Specification Group Radio Access Network; Evolved Universal Terrestrial Access (E-UTRA); Radio Resource Control (RRC); Protocol specification (Release 9), 3GPP TS 36.331 V9.6.0. Mar. 2011.

* cited by examiner

METHOD AND APPARATUS FOR HANDLING A CELL CHANGE

CROSS-REFERENCE TO RELATED APPLICATIONS

This application is a continuation of U.S. patent application Ser. No. 13/503,646, (now U.S. Pat. No. 9,173,150), filed on Apr. 23, 2012, which is a National Stage Entry of International Application No. PCT/SE2012/050351, filed on Mar. 29, 2012, (Publication No. WO 2012/177205, publication date Dec. 27, 2012), which is related to, and claims priority from, U.S. Provisional Patent Application No. 61/499,689, filed on Jun. 21, 2011, the disclosure of all of these applications being expressly incorporated here by reference. This application is related to U.S. patent application Ser. No. 13/503,846.

TECHNICAL FIELD

Example embodiments presented herein are directed towards a user equipment, and corresponding method therein, for handling a cell change. Example embodiments presented herein are also directed towards a network node, and corresponding method therein, for handling a cell change of a user equipment.

BACKGROUND

Overview of Wireless Communications Networks

In a typical cellular system, also referred to as a wireless communications network, wireless terminals, also known as mobile stations or user equipments, communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "eNodeB" or "NodeB" and which in this document also is referred to as a base station. A cell is a geographical area where radio coverage is provided by the radio base station equipment installed at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, .e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks. In some networks, there is also an interface between radio nodes, e.g., the X2 interface between eNodeBs in LTE.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units. The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

Radio measurements play a key role in wireless communications. At a general level, radio measurements may be categorized into signal strength/quality measurements, timing measurements, and other measurements. The measurements may be performed by the user equipment and/or radio network nodes equipped with a radio interface. The different categories or radio measurements, and other network aspects related to radio measurements, are described in greater detail below according to the provided sub-headings.

Signal Strength and Quality Measurements

Examples of LTE measurements characterizing signal strength or quality of a given cell are Reference Signal Received Power (RSRP), Reference Signal Received Quality (RSRQ), received interference power, and thermal noise power. RSRP and RSRQ are currently defined as user equipment measurements, e.g., in DL, and associated with cell-specific reference signals (CRS). However, received signal strength and received signal quality measurements are known to be more general, e.g., for any type of signal and for DL and UL. Similar measurements exist in UMTS, GSM and CDMA2000, etc.

Timing Measurements

In LTE, the following user equipment timing measurements have been standardized since release 9, user equipment Rx–Tx time difference, Reference Signal Time Difference (RSTD), and user equipment GNSS Timing of Cell Frames for user equipment positioning. The following E-UTRAN measurements have been standardized since release 9, eNodeB Rx–Tx time difference, Timing Advance (TA),TA Type 1=(eNB Rx–Tx time difference)+(user equipment Rx–Tx time difference),TA Type 2=(eNB Rx–Tx time difference), and E-UTRAN GNSS Timing of Cell Frames for user equipment positioning.

In addition, there may also be measurements that are not explicitly standardized, but may still be implemented by user equipment or E-UTRAN or standardized later. Some examples of these measurements may be time of arrival, measured by radio node, e.g., eNodeB or a radio measurement node such as LMU,RSTD measured by radio nodes, one way propagation delay, measured by eNode B for estimation of timing advanced to be signaled to the user equipment (a similar user equipment measurement may be defined in the future), and timing measurements over multifarious links. Similar measurements may also exist in other RATs, e.g., Rx–Tx measurements may be similar to Round Trip Time (RTT) measurements in UMTS, and RSTD may be similar to a System Frame Number (SFN)-to-SFN time difference in UMTS.

Timing measurements may be used for positioning (e.g., with Enhanced Cell Identification (E-CID), Adaptive Enhanced Cell ID (AECID), pattern matching, Observed Time Difference of Arrival (OTDOA), Uplink Time Difference of Arrival (U-TDOA), hybrid positioning methods), Minimization of Drive Tests (MDT), network planning, Self-Optimizing/Organizing Network (SON), enhanced inter-cell resource and interference coordination (eICIC) and heterogeneous network (HetNet) (e.g., for optimizing the cell ranges of different cell types), configuration of handover parameters, time-coordinated scheduling, etc. Measurements of a general purpose are typically configured by the serving/primary cell. Measurements of a specific purpose may be configured by other nodes, e.g., by positioning node (e.g., Evolved Serving Mobile Location Centre (E-SMLC) or Secure User Plane Location Platform (SLP) in LTE), SON node, MDT node, etc.

Timing advance may also be used to control the timing adjustment of user equipment UL transmissions. The adjustment is transmitted to the UE in the timing advance command. In LTE, for user equipments not supporting LPP, the user equipment timing adjustment may be based on TA Type 2.

User equipment measurements configured by the network are typically reported to a network node, e.g., eNodeB, positioning node, etc. Radio node measurements may also be reported to a network node, e.g., another radio node such as eNodeB or LMU, or other network node such as positioning node. Some measurements may be not reported but used internally by the measuring node, including the user equipment. Furthermore, some measurements may involve both directions (DL and UL), e.g., Rx–Tx measurements. It should also be appreciated that the user equipment may also be involved in the radio node (e.g., eNodeB) measurements such as Rx–Tx measurements, and eNodeB may also be involved in the user equipment measurements such as Rx–Tx measurement.

Other Measurements

An example of a measurement that does not belong to the first two groups of measurements is an Angle of Arrival (AoA) measurement. In the current LTE standard, AoA is defined as an E-UTRAN measurement. However, AoA measurements performed by the user equipment are also known.

Inter-frequency, Inter-band, and Inter-RAT Measurements

User equipments typically support all intra-RAT measurements (i.e. inter-frequency and intra-band measurements) and meet the associated requirements. However the inter-band and inter-RAT measurements are user equipment capabilities, which are reported to the network during the call setup. The user equipment supporting certain inter-RAT measurements should meet the corresponding requirements. For example a user equipment supporting LTE and WCDMA should support intra-LTE measurements, intra-WCDMA measurements and inter-RAT measurements (i.e. measuring WCDMA when serving cell is LTE and measuring LTE when serving cell is WCDMA). Hence, the network can use these capabilities according to its strategy. These capabilities are highly driven by factors such as market demand, cost, typical network deployment scenarios, frequency allocation, etc.

Inter-frequency Measurements

Inter-frequency measurements involve measurements on at least one cell (e.g., RSTD measurement involves two cells) that belong to a frequency/carrier different from the serving/primary cell frequency/carrier. Examples of inter-frequency measurements are inter-frequency RSRP, inter-frequency RSRQ, inter-frequency RSTD, etc.

The user equipment performs inter-frequency and inter-RAT measurements in measurement gaps. The measurements may be done for various purposes: mobility, positioning, self organizing network (SON), minimization of drive tests, etc. Furthermore, the same gap pattern is used for all types of inter-frequency and inter-RAT measurements. Therefore E-UTRAN must provide a single measurement gap pattern with constant gap duration for concurrent monitoring (i.e. cell detection and measurements) of all frequency layers and RATs.

Inter-RAT Measurements

In general, in LTE inter-RAT measurements are typically defined similar to inter-frequency measurements, e.g. they may also require configuring measurement gaps like for inter-frequency measurements, but just with more measurements restrictions and often more relaxed requirements for inter-RAT measurements. As a special example, there may also be multiple networks using the overlapping sets of RATs. The examples of inter-RAT measurements specified currently for LTE are UTRA FDD CPICH RSCP, UTRA FDD carrier RSSI, UTRA FDD CPICH Ec/No, GSM carrier RSSI, and CDMA2000 1× RTT Pilot Strength. LTE FDD and TDD may also be treated as different RATs.

Inter-band Measurements

An inter-band measurement refers to the measurement done by the user equipment on a target cell on the carrier frequency belonging to the frequency band which is different than that of the serving/primary cell. Both inter-frequency and inter-RAT measurements can be intra-band or inter-band.

The motivation for inter-band measurements is that most of the user equipments today support multiple bands even for the same technology. This is driven by the interest from service providers; a single service provider may own carriers in different bands and would like to make efficient use of carriers by performing load balancing on different carriers. A well-known example is that of multi-band GSM terminal with 800/900/1800/1900 bands.

Furthermore, a user equipment may also support multiple technologies e.g. GSM, UTRA FDD and E-UTRAN FDD. Since all UTRA and E-UTRA bands are common, therefore the multi-RAT user equipment may support same bands for all the supported RATs.

Carrier Aggregation (CA) Networks

A multi-carrier system (or interchangeably called as the carrier aggregation (CA)) allows the user equipment to simultaneously receive and/or transmit data over more than one carrier frequency. Each carrier frequency is often referred to as a component carrier (CC) or simply a serving cell in the serving sector, more specifically a primary serving cell or secondary serving cell. The multi-carrier concept is used in both HSPA and LTE. Carrier aggregation is supported for both contiguous and non-contiguous component carriers, and component carriers originating from the same eNodeB need not to provide the same coverage. Furthermore, carriers may also belong to different RATs. Below definitions are provided for various cells in a CA network.

Serving Cell: for a user equipment in RRC_CONNECTED not configured with CA there may be only one serving cell comprising the primary cell. For a user equipment in RRC_CONNECTED configured with CA, the term 'serving cells' is used to denote the set of one or more cells comprising of the primary cell and all secondary cells.

Primary Cell (PCell): the cell, operating on the primary frequency, in which the user equipment either performs the initial connection establishment procedure or initiates the connection re-establishment procedure, or the cell indicated as the primary cell in the handover procedure.

Secondary Cell (SCell): a cell, operating on a secondary frequency, which may be configured once an RRC connection is established and which may be used to provide additional radio resources.

In the downlink, the carrier corresponding to the PCell is the Downlink Primary Component Carrier (DL PCC) while in the uplink it is the Uplink Primary Component Carrier (UL PCC). Depending on user equipment capabilities, Secondary Cells (SCells) can be configured to form together with the PCell a set of serving cells. In the downlink, the carrier corresponding to a SCell is a Downlink Secondary Component Carrier (DL SCC) while in the uplink it is an Uplink Secondary Component Carrier (UL SCC).

In CA the base station (e.g. eNode B) in LTE can deactivate one or more secondary cells on the corresponding secondary carriers. The deactivation is done by the eNode B using lower layer signaling (e.g. over PDCCH in LTE) using a short command such as ON/OFF (e.g. using 1 bit for each SCell). The activation/deactivation command is sent to the user equipment via the PCell. Typically the deactivation is done when there is no data to transmit on the SCell(s). The activation/deactivation can be done independently on uplink and downlink SCell. The purpose of the deactivation is thus to enable user equipment battery saving. The deactivated SCell(s) can be activated also by the same lower layer signaling.

Cell Change in LTE

Herein, a cell change is referred to as changing the cell to which the user equipment is associated to. The cell change may further refer, for example, to:
 serving cell change (e.g., at handover in a non-CA system or when the user equipment is not configured with any SCell),
 serving cell set change (e.g., in a CA system adding/removing/modifying an SCell),
 PCell change (e.g., in a CA system changing the current PCell being cell with the first cell identity to another cell with the second cell identity).

A cell change may occur, for example, during:
 Handover (intra-frequency, inter-frequency or inter-RAT), or
 PCell change on the same PCC (in a CA system), or
 Carrier switching (changing the current PCC to another frequency carrier, which implies also PCell change).

A cell change may be due to e.g. mobility, load balancing, energy saving, carrier activation/deactivation or cell activation/deactivation, secondary carrier activation/deactivation or secondary cell (or secondary serving cell) activation/deactivation, etc.

Measurement Requirements at a Cell Change

Most of the measurements characterize a signal of a specific cell, e.g., a serving or a neighbor cell. Some of the measurements relate to signals of two specific cells, e.g., relative measurements such as RSTD between a neighbor and a reference cell. A few measurements characterize the radio environment at a specific location (e.g., interference- and noise-related measurements such as Thermal noise power, Received Interference Power, RSSI or Noise Rise).

A measurement may be specified for a certain cell (e.g., identified by the cell identity) or a certain cell category (e.g., a serving cell, reference cell, neighbor cell). The cell identification of the same cell does not change when e.g. the serving cell change occurs for a user equipment. However, the category of a cell may or may not change when the user equipment is moving from one cell to another cell, e.g., the serving cell changes during handover or carrier switching, but OTDOA reference cell may not change. Therefore, the measurements associated with a certain cell (e.g., like in OTDOA) may in principle continue after, e.g., handover, whilst the measurement associated with a certain cell category may need to be stopped or restarted at handover, depending on the measurement and cell category.

Example 1: Requirements for User Equipment Rx-Tx Measurements for Positioning When Handover Occurs The current standard specifies that if the user equipment is performing user equipment Rx-Tx time difference measurement while the serving cell is changed due to the handover then the user equipment shall restart the Rx-Tx measurement on the new cell. In this case the user equipment shall also meet the user equipment Rx-Tx time difference measurement and accuracy requirements. However the physical layer measurement period of the user equipment Rx-Tx measurement shall not exceed $T_{measure\_FDD\_UE\_Rx\_Tx3}$ as defined in the following expression:

$T_{measure\_FDD\_UE\_Rx\_Tx3} = (K+1)*(T_{measure\_FDD\_UE\_Rx\_Tx1}) + K*T_{PCell\_change\_handover}$, where K is the number of times the serving cell is changed over the measurement period ($T_{measure\_FDD\_UE\_Rx\_Tx3}$), $T_{PCell\_change\_handover}$ is the time to change the serving cell due to handover; it can be up to 45 ms.

Example 2: Requirements for User Equipment Rx-Tx Measurements for Positioning When PCell Switching Occurs with Carrier Aggregation.

If the user equipment supporting E-UTRA carrier aggregation when configured with the secondary component carrier is performing user equipment Rx-Tx time difference measurement while the PCell is changed regardless whether the primary component carrier is changed or not then the user equipment shall restart the Rx-Tx measurement on the new PCell. In this case the user equipment shall also meet the user equipment Rx-Tx time difference measurement and accuracy requirements. However the physical layer measurement period of the user equipment Rx-Tx measurement shall not exceed $T_{measure\_FDD\_UE\_Rx\_Tx2}$ as defined in the following expression: $T_{measure\_FDD\_UE\_Rx\_Tx2} = (N+1)*(T_{measure\_FDD\_UE\_Rx\_Tx1}) + N*T_{Pcell\_change\_CA}$, where: N is the number of times the PCell is changed over the measurement period ($T_{measure\_FDD\_UE\_Rx\_Tx2}$), $T_{Pcell\_change\_CA}$ is the time to change the PCell; it can be up to 25 ms.

For OTDOA, the user equipment performs RSTD measurements with respect to the reference cell, so in general the user equipment should be able to continue the RSTD measurements after the serving/primary cell changes when the assistance data is provided with respect to a reference cell which is not restricted to be the serving cell.

Impact of RF Receiver Reconfiguration on Measurement

In single carrier LTE, the cell may operate at the channel bandwidths ranging from 1.4 MHz to 20 MHz. However, single-carrier legacy user equipment shall be able to receive and transmit over 20 MHz, i.e., the maximum single-carrier LTE bandwidth. If the serving cell bandwidth is smaller than 20 MHz, then the user equipment may also shorten the bandwidth of its RF front end. For example, if the serving cell bandwidth (BW) is 5 MHz, then the user equipment may also configure its RF BW to 5 MHz. This approach has several advantages. For example it enables the user equipment:
 To prevent the user equipment from the noise outside the current reception bandwidth,
 To save its battery life by lowering the power consumption.

The reconfiguration of the user equipment reception and/or transmission bandwidth involves some delay, e.g., 0.5-2 ms or longer, depending upon user equipment implementation and also whether both UL BW and DL BW are reconfigured at the same time or not. This small delay is often referred to as a 'glitch'. During the glitch the user equipment cannot receive from the serving cell or transmit to the serving cell. Hence this may lead to interruption in data reception/transmission from/to serving cell. The user equipment is also unable to perform any type of measurements during the glitch. The glitch occurs either when the user equipment extends its bandwidth (e.g. from 5 MHz to 10 MHz) or when it shortens its bandwidth (e.g. from 10 MHz to 5 MHz).

Furthermore, when the user equipment operates at a bandwidth lower than its maximum reception capability and the user equipment wants to measure over a larger than the current bandwidth, e.g., for measuring a cell on the same frequency, then it has to open its receiver for performing the measurement. Thus, in this case (i.e. when current BW<max BW) the glitch occurs before and after the user equipment obtains each measurement sample, if the user equipment reconfigures back to its current operation after each measurement sample over the larger bandwidth. On the other hand, keeping the receiver open, e.g. up to max bandwidth, to enable a measurement of a larger-bandwidth neighbor cell on the same frequency without a glitch when the system bandwidth of a first measured cell is smaller than max BW would lead to performance degradation of the first cell measurements.

The glitch also occurs when the CA capable user equipment reconfigures its bandwidth from single carrier to multiple carrier mode or vice versa, or when activating/deactivating CA cells or component carriers. For example, consider CA capable user equipment supporting 2 DL component carriers each of 20 MHz: PCC and 1 SCC. If the secondary component carrier is deactivated by the serving/primary cell then the user equipment will shorten its BW e.g. from 40 MHz to 20 MHz. This may cause 1-2 ms or even longer interruption on the PCC.

Positioning Architecture in LTE

The three key network elements in an LTE positioning architecture are the LCS Client, the LCS target and the LCS Server. The LCS Server is a physical or logical entity managing positioning for a LCS target device (typically a user equipment or a radio node) by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in a network node, radio network node, a user equipment, and it may also reside in the LCS targets themselves. An LCS Client sends a request to LCS Server to obtain location information, and LCS Server processes and serves the received requests and sends the positioning result and optionally a velocity estimate to the LCS Client. A positioning request can be originated from the terminal, radio network or the network.

Position calculation can be conducted, for example, by a positioning server (e.g. E-SMLC or SLP in LTE) or UE. The former approach corresponds to the user equipment-assisted positioning mode, whilst the latter corresponds to the user equipment-based positioning mode.

Two positioning protocols operating via the radio network exist in LTE, LPP and LPPa. The LPP is a point-to-point protocol between a LCS Server and a LCS target device, used in order to position the target device. LPP can be used both in the user and control plane, and multiple LPP procedures are allowed in series and/or in parallel thereby reducing latency. LPPa is a protocol between eNodeB and LCS Server specified only for control-plane positioning procedures, although it still can assist user-plane positioning by querying eNodeBs for information and eNodeB measurements. SUPL protocol is used as a transport for LPP in the user plane. LPP has also a possibility to convey LPP extension messages inside LPP messages, e.g. currently OMA LPP extensions are being specified (LPPa) to allow e.g. for operator-specific assistance data or assistance data that cannot be provided with LPP or to support other position reporting formats or new positioning methods.

A high-level architecture, as it is currently standardized in LTE, is illustrated in FIG. 1, where the LCS target is a terminal, and the LCS Server is an E-SMLC or an SLP. In the figure, the control plane positioning protocols with E-SMLC as the terminating point are shown in blue, and the user plane positioning protocol is shown in red. SLP may comprise two components, SPC and SLC, which may also reside in different nodes. In an example implementation, SPC has a proprietary interface with E-SMLC, and Llp interface with SLC, and the SLC part of SLP communicates with P-GW (PDN-Gateway) and External LCS Client.

Additional positioning architecture elements may also be deployed to further enhance performance of specific positioning methods. For example, deploying radio beacons is a cost-efficient solution which may significantly improve positioning performance indoors and also outdoors by allowing more accurate positioning, for example, with proximity location techniques.

SUMMARY

During operations, a user equipment may often change from one cell to another, referred to as a cell change operation. During a mobility procedure, resulting in a cell change, positioning measurements performed by a user equipment may be interrupted or negatively affected. Thus, at least one object of some of the example embodiments presented herein is to provide a way of handling such cell changes to minimize or reduce interruptions on measurements caused by the cell change.

Thus, example embodiments presented herein are directed towards improved positioning measurements during a user equipment cell change. Some of the example embodiments presented herein may be generally summarized as follows:

Enabling the network node (e.g., eNode B, MDT, SON, positioning node, etc) to obtain user equipment cell changing information (e.g. list of serving/primary cells, additional user equipment trajectory information etc) over certain time period.
  Configuration of a node with specific measurements while accounting for cell change of the user equipment.
  The user equipment performing configured measurements while accounting for cell change.
  The obtained user equipment cell change information being used by the network node for one or more task associated with the monitoring, management and/or planning of the network, positioning, tracking, etc.
  Pre-defined rules on user equipment behavior to ensure user equipment meets positioning measurement requirements during cell change (i.e. when the serving cell/PCell changes) over the positioning measurement period while taking into account at least the bandwidth of all the serving cell(s)/PCell(s).

Accordingly, some of the example embodiments presented herein may be directed towards a method in a user equipment for handling a cell change, where the user equipment is comprised in a wireless communications network. The method comprises performing at least one measurement and receiving, from a network node, a notification of, and information associated with, a cell change from a first cell to a second cell. The method also comprises performing the cell change during the at least one measurement and altering a duration of a measurement time over which the at least one measurement is performed. The method further comprises altering a measurement bandwidth of the at least one measurement, wherein the altering is based on the associated bandwidths of the first and a second cells. The method also comprises completing the at least one measurement based on the altered duration of measurement time and the altered measurement bandwidth.

Some example embodiments may be directed towards a user equipment for handling a cell change, where the user equipment is comprised in a wireless communications network, the user equipment comprises a measurement unit configured to perform at least one measurement and a receiving port configured to receive, from a network node, a notification of, and information associated with, the cell change from a first cell to a second cell. The measurement unit is further configured to perform the cell change during the at least one measurement. The user equipment also comprises an alteration unit configured to alter a duration of a measurement time over which the at least one measurement is performed. The alteration unit is further configured to alter a measurement bandwidth of the at least one measurement, wherein the alteration of the measurement time and the measured bandwidth is based on associated bandwidths of the first and second cells. The measurement unit is further configured to complete the at least one measurement based on the altered duration of measurement time and the altered measurement bandwidth.

Some example embodiments are directed towards a method in a network node for handling a cell change of user equipment, where the network node is comprised in a wireless communications network. The method comprises sending a request, to a user equipment, for performing at least one measurement and determining information associated with a cell change from a first cell to a second cell, where the information associated with the cell change comprises alteration instructions for altering a user equipment measurement time and measurement bandwidth in a presence of the cell change. The method further comprises sending, to the user equipment, a notification of, and the information associated with, the cell change. The method further comprising receiving, from the user equipment, measurement data from a user equipment, the measurement data comprising at least one other measurement performed over the altered duration of measurement time and the altered measurement bandwidth, wherein the altered duration of measurement time and the altered measurement bandwidth are based on bandwidths associated with the first and the second cells.

Some example embodiments may be directed towards a network node for handling a cell change of a user equipment, where the network node is comprised in a wireless communications network. The network node comprises a transmitting port configured to transmit a request, to a user equipment, for performing at least one measurement and an alteration unit configured to determine instructions for altering a user equipment measurement time and measurement bandwidth in a presence of a cell change form a first cell to a second cell. The transmitting port is further configured to send, to the user equipment, a notification of, and information associated with, the cell change, said information comprising the instructions for altering. The network node also comprising a receiving port configured to receive, from the user equipment, measurement data, said measurement data comprising at least one other measurement performed over an altered duration of measurement time and an altered measurement bandwidth, wherein the altered duration of measurement time and the altered measurement bandwidth are based on the transmitted instructions for altering and bandwidths associated with the first and the second cells.

The example embodiments presented herein provide increased accuracy of position measuring in radio networks and enable maintaining the positioning performance when a cell change occurs during a measurement. Furthermore, utilizing the example embodiments presented herein may provide for greater efficiency in the usage of network resources.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Overview of Positioning Measurements

Figure 1:
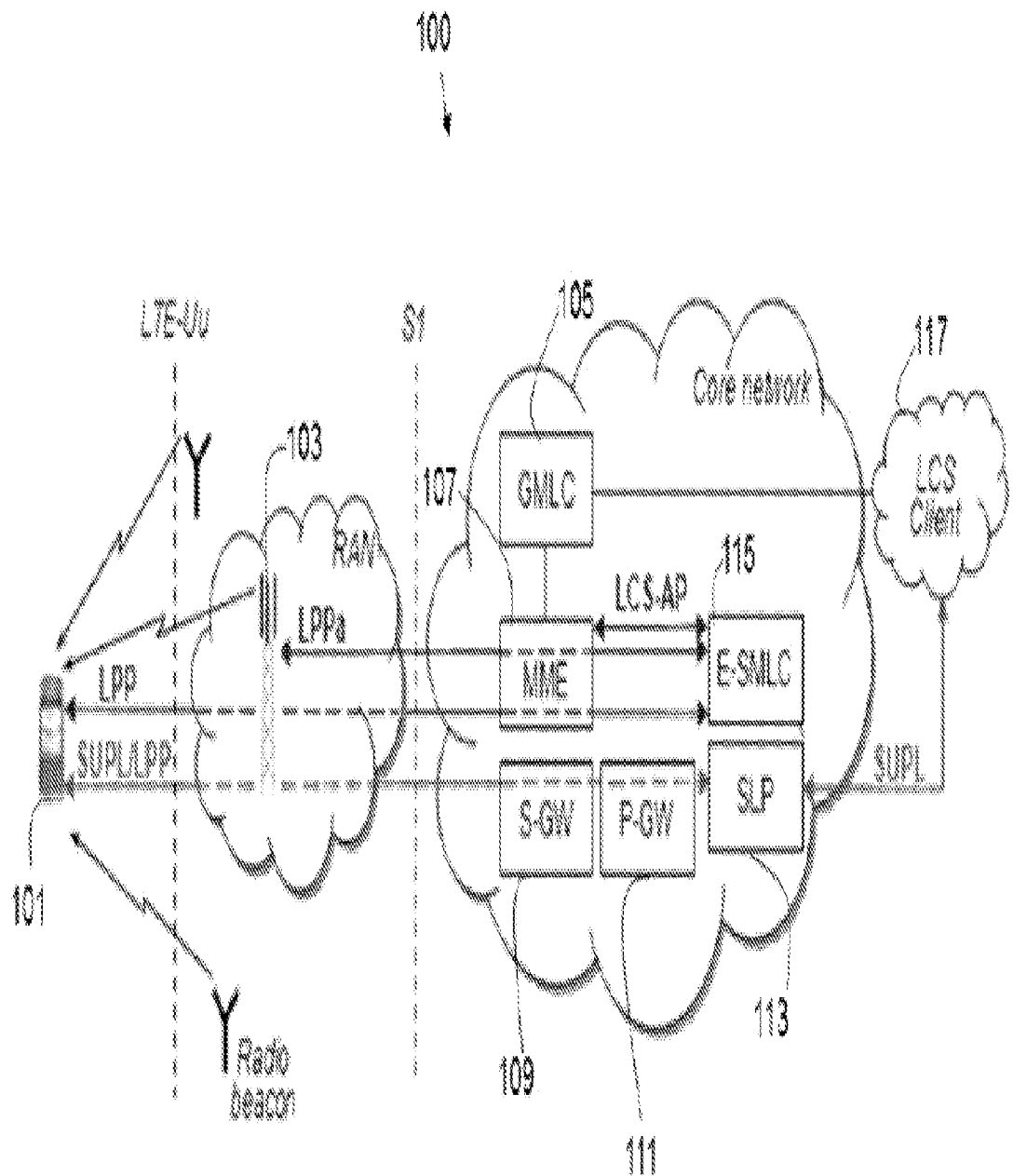
FIG. 1 is a schematic of positioning architecture in LTE.

For the purposes of explanation, an overview of positioning methods will be provided. Thereafter, limitations of such methods will be identified and discussed. FIG. 1 illustrates positioning architecture in an LTE system. The positioning architecture may comprise a user equipment 101 which may be configured to perform positioning measurements. The user equipment 101 may be in communication with a base station 103. The base station 103 may be in communication with a core network comprising a Serving Gateway (SGW) 109, a Packet Data Network Gateway (PGW) 111 and a Mobility Management Entity (MME) 107. The core network may also comprise one or more nodes with positioning functionality, for example, a Gateway Mobile Location Centre (GMLC) 105, an Enhanced Serving Mobile Location Centre (E-SMLC) 115 and/or a Secure User Plane Location Platform (SLP) 113.

The GMLC 105 may be used to request routing information from the HLR (Home Location register) or HSS (Home Subscriber Server). The GMLC 105 may also be used to send positioning requests to either the VMSC (Visited Mobile Switching Centre), SGSN (Serving GPRS Support Node), MSC (Mobile Switching Centre) Server, or MME and receive final location estimates from the corresponding entity. The E-SMLC 115 may communicate with the user equipment 101 for location services and assistance data delivery using an LPP protocol. The E-SMLC 115 may also communication with the base station 103 of assistance data purposes using an LPPa protocol. The SLP 113 may be responsible for coordination and administrative functions to provide location services. The SLP 113 may also be responsible for positioning functions. The SLP 113 is a positioning node in the user plane.

Figure 2:
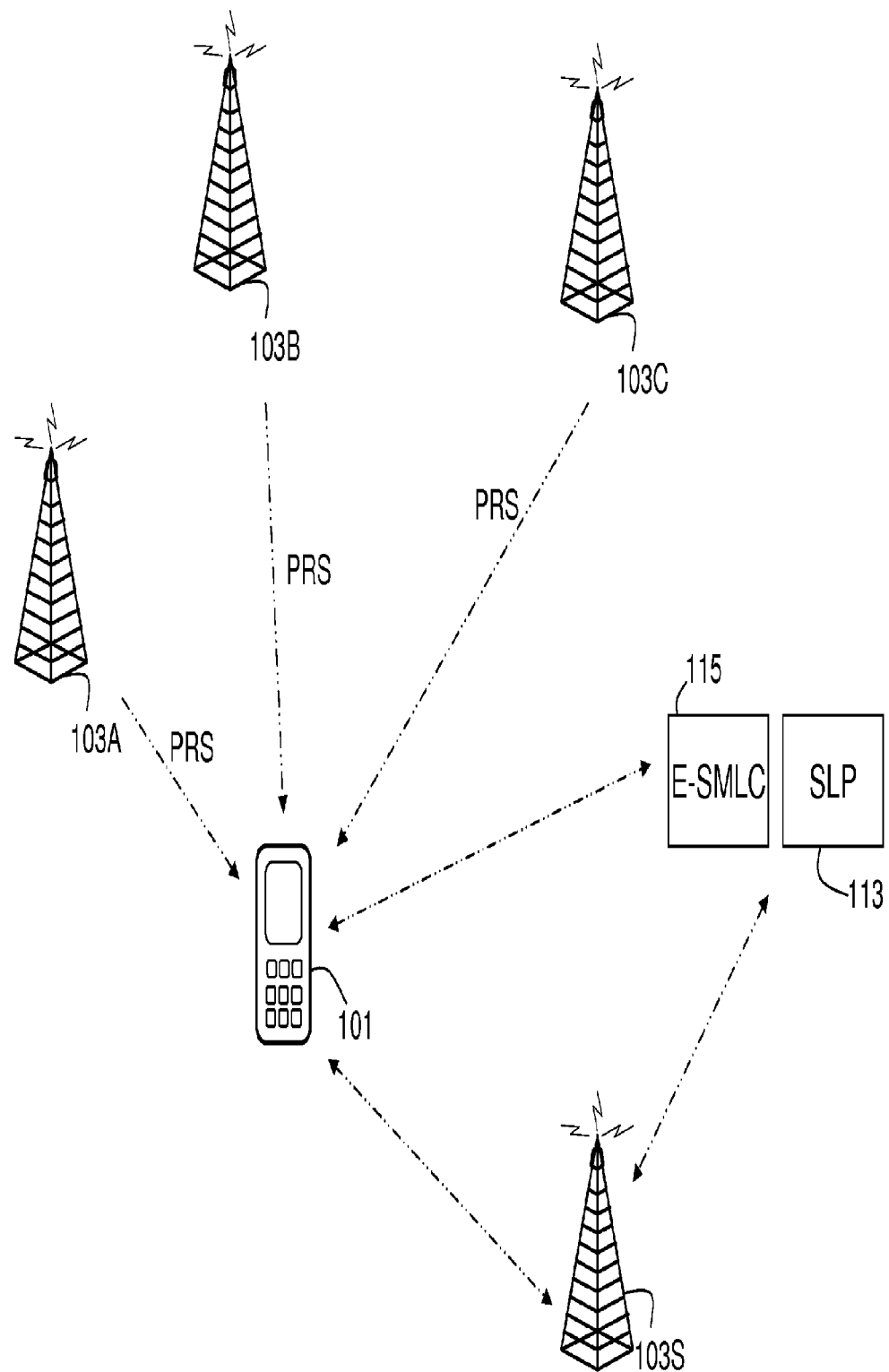
FIG. 2 is an illustrative example of user equipment performing a positioning measurement.

FIG. 2 illustrates an overview of a positioning measurement performed by a user equipment 101. During the measurement, the user equipment may be in communication with a serving base station 103S. The user equipment 101 may be configured to receive measurements from a number of base stations 103A-103C. The user equipment may also be in communication with positioning nodes E-SMLC 115 and/or SLP 113. During positioning measurements, often the bandwidth of the serving cell associated with the serving base station 103S, the bandwidth of various measured cells associated with base stations 103A-103C, and the bandwidth of various Positioning Reference Signals (PRS) may need to be taken into account.

Limitations of Current Solutions

The following is a discussion on limitations of current solutions which have been identified by the inventors. The discussions of the limitations also comprise a discussion of possible solutions to such limitations, which the inventors have realized. During a mobility procedure, positioning measurements performed by a user equipment 101 may be interrupted or negatively effected. The interruptions and/or negative effects may be caused by a cell change resulting from the mobility procedure.

There are numerous problems associated with current positioning solutions during a cell change. At least the following problems have been identified:

- For positioning measurements, the serving cell may be not in the OTDOA assistance data and thus the user equipment will not report measurement for it, so the positioning node is not aware with the current standard of whether the serving cell has changed during the measurement period or not, although the serving cell configuration and the number of changes do impact the measurement accuracy and reporting time.
- For measurements with respect to a reference cell (e.g., RSTD measurements or relative RSRP/RSRQ measurements), the user equipment behavior and the measurement time is still not clear when the serving/primary cell changes
- Theoretically, the user equipment should be able to continue measurements if they are defined for non-serving cells as well; however, there may be different impact on the complexity e.g. depending on whether this is a CA system or whether the frequency/carrier has changed (since intra- and inter-frequency requirements are different).
- If there are multiple cell changes during the measurement, this may also need to be taken into account.
- The network node (e.g., positioning node) is not aware of the serving/primary cell changes which could occur during the on-going measurement
- When a measurement is received by the network, the received measurement may be less accurate and/or reported after a longer time, but the network may collect statistics on the measurements and use it for other purposes (e.g., SON) and may wrongly classify the measurement without being aware of the reason the degraded performance;
- When the measurement is being performed, the network being not aware of the reason for a long measurement time may break the session before the measurement is received, even though the measurement time is according to the requirement which may account for the number of cell switches;
- When a measurement requirement accounting for the serving/primary cell changes is tested, the test equipment has to be aware of e.g. the information associated with cell change.
- When multiple cell changes occur during a measurement, the network (e.g., positioning node or SON) would benefit from the history of cell changes, which currently cannot be reported as a single measurement and which would be particularly beneficial in a network deployments with small cells, in particular for positioning, MDT, user equipment tracking, etc.

Thus, according to some of the example embodiments, a user equipment may be configured to adapt its behaviour during a positioning measurement as a result of the mobility procedure. Such an adaption may account for cell changes as a result of the mobility procedure. Furthermore, some example embodiments may be directed towards a network node adapting positioning measurement instructions, which may be provided to the user equipment, based on a cell change.

Brief Overview of the Example Embodiments

In order to remedy the above highlighted problems with the current art, example embodiments are presented herein which provide improved measurement management during cell changes. Some of the example embodiments may comprise the recordation and use of information, obtained by a user equipment, associated with a current cell. Such information may be utilized by the user equipment, a positioning node, a base station, or any other network node for measurement management or general resource management. Other example embodiments may comprise the alteration of a current measurement scheme based on implemented rules and/or the user equipment obtained data. Different aspects of the example embodiments are described in greater detail below according to the appropriate sub-heading.

Recordation of User Equipment Trajectory

According to some of the example embodiments, a user equipment 101 may be configured to record data associated with a cell the user equipment is currently associated with. Example embodiments further comprise the user equipment retaining such information upon leaving such cell. Thus, the user equipment may retain information associated with a user equipment trajectory and various cell changes.

According to the example embodiments, there are various signalling procedures and configuration methods for obtaining the information associated with the cell change of the user equipment. The information may be obtained from the user equipment and/or from a suitable network node which may serve the user equipment.

The following nodes may be involved in communicating information associated with cell changing. It should be appreciated that the examples provided are non-limiting and are not method steps.

The user equipment may receive (e.g., via LPP or RRC) a request or indication to collect and report the information associated with cell changing. The information associated with cell changing may be collected, stored and signalled by the user equipment to another node (e.g., positioning node, eNodeB, LMU, MDT node, SON node, etc.).

Radio nodes may also be involved in the communication of information associated with cell changes. The radio node may receive (e.g., via LPPa) a request or indication to collect and report the information associated with cell changing. The information associated with cell changing may be collected, stored and signalled by the radio node to another node (e.g., another radio node, positioning node, SON node, MDT node, etc.). The information associated with cell changing may be received from the user equipment. The information associated with cell changing may be received from another radio node (e.g., eNodeB or LMU), e.g., via X2 in a handover command or other signalling.

Various other network nodes may also be involved in the communication of information associated with cell changes. The network node may send a request or indication to the user equipment to collect and report the information associated with cell changing. The network node may send a request or indication to the radio node to collect and report the information associated with cell changing. The network node may send a request to another network node and receive the information associated with cell changing for a specific user equipment or the statistics of the information associated with cell changing collected over time and/or for a group of user equipments.

The information associated with cell changing may be received from a user equipment. The information associated with cell changing may be received from another network node (e.g., positioning node, SON node, MDT node, etc.). The information associated with cell changing may also be received from a radio node.

The information associated with cell changing may comprise of user equipment trajectory information. The user equipment trajectory information may comprise of at least a list of cell IDs or an ordered sequence of cell IDs of cells on which the user equipment is connected to or camped on during certain time period. The order of the list may be in order of cell changes over time.

According to some of the example embodiments, all cells over a predetermined time period may be included in the user equipment recordation. According to some of the example embodiments, only cells on which the user equipment camps on or connects to for at least certain minimum time are provided. According to some of the example embodiments, the list of cells may be obtained over a time period, which is associated with certain type of measurement, e.g., time over which user equipment performs and logs MDT measurements (e.g., 2 hours typically for MDT). According to some of the example embodiments, the time period over which cell change information is to be obtained may be linked to positioning measurement session or period (e.g., the time interval of one RSTD measurement session), etc.

The user equipment may also report an ordered sequence (cell_ID1, cell_ID2, . . . , cell_IDN), where the cells with cell_ID1, cell_ID2, . . . , cell_IDN had been the serving/primary cells during the said time interval or one positioning measurement session (e.g. for OTDOA or E-CID). The user equipment may either report the physical cell ID (PCI) or cell global ID (CGI). The user equipment may be configured by the network node to report certain type of cell identifier.

Cells in the list/sequence may also be time-stamped, e.g., together with the cell identifiers. The time stamped information may be provided in different manners. In one example the user equipment may provide the time for a cell when the user equipment was initially connected to/camped on to that cell. According to some of the example embodiments, the user equipment may provide the time for a cell when the user equipment was left the serving cell. According to some of the example embodiments, the time stamp for a cell may correspond to the time during which user equipment was connected to or camped on to that cell. The user equipment may report relative time-stamp for each cell in the list. The relative time may be a time reference to a time provided by the network node or a time-stamp corresponding to the last serving/primary cell or to a reference cell. The user equipment may also be configured by the network node to report the time-stamp for each serving cell according to any of the examples listed above.

The user equipment may also be configured with sets of cell IDs (e.g. first set and second set), which indicate the start and end of the tracking of the trajectory. For example when the serving/primary cell belongs to first set of cell IDs then the user equipment starts the logging of the trajectory information and it stops the logging when the serving/primary cell belongs to the second set of cell IDs. The network can also configure the time period. For example after the expiry of this time the user equipment may stop the logging the trajectory information even if the no does not find a serving/primary cell whose cell ID does no match to the second set of cell Ds. Another non-limiting example of the first cell IDs may be associated with the first type of cells (e.g., large or macro cells) and of the second set of cell IDs may be associated with the second type of cells (e.g., small cells such as femto or pico cells).

The user equipment may also be configured by the network node to report at least N (e.g. N=5) neighbour cells of each serving/PCell or specific serving cell/PCell as part of the trajectory information. The user equipment therefore acquires and stores all neighbour cells for the given serving cell/PCell and report the results to the network node. As a special case the user equipment may also be configured by the network node to report at least the strongest neighbour cell and/or strongest neighbour cell of each serving/PCell or specific serving cell/PCell as part of the trajectory information.

The user equipment may also be configured to record cell identification information (may be used independently on whether the trajectory information is used in the network or not) for at least one cell in the list/sequence. Examples of such cell identification may be a last serving/primary cell during a predetermined time interval, a carrier frequency of each cell during the predetermined time interval, the first serving/primary cell during the predetermined time interval, the cell that has been the serving/primary cell during the longest time within the predetermined time interval, the cell(s) selected according to a pre-defined rule, the cell(s) on a certain frequency, and/or the cell(s) of a certain type (e.g., CSG cells, macro cells, pico cells).

The user equipment may also be configured to record cell identification information with respect to signal measurements. Specifically, the user equipment may be configured to record signal measurement (e.g. RSRP, RSRQ) results of serving/primary cell. Examples of such measurements results may be the smallest and largest values of certain measurements done on serving/primary cell while the user equipment is connected to/camped on this cell, and/or values of the certain measurements done on serving/primary cell when the user equipment initially connects to/camps on this cell and/or when user equipment leaves this cell.

According to some of the example embodiments, further examples of cell information (relating to measurements) may comprise an indication of a cell type for at least one cell in the list/sequence, and/or bandwidth information for at least one cell in the list/sequence. Example of such bandwidth information may comprise a system bandwidth (aka channel bandwidth, cell transmission bandwidth etc), and/or a measurement bandwidth (the bandwidth used for doing specific type(s) of measurement(s)). Some non-limiting examples of such bandwidths are a cell measurement bandwidth, specific signal (e.g. PRS) measurement bandwidth, SRS measurement bandwidth, a smallest measurement bandwidth of serving/primary cells (e.g., among all serving/primary cells) during the said intervals, a largest measurement bandwidth of serving/primary cells (e.g., among all serving/primary cells) during the said intervals, a smallest system/transmission/channel bandwidth of serving/primary cells (e.g., among all serving/primary cells) during the said intervals, and/or a largest system/transmission/channel bandwidth of all serving/primary cells (e.g., among all serving/primary cells) during the said intervals.

According to some example embodiments, the user equipment may also be configured to record bandwidth information associated with the entire reported measurement during which at least one cell change occurred. Examples of such information may be a measurement bandwidth based on which the measurement reporting time is to be defined (this information may be particularly important e.g. for testing measurement requirements). The user equipment may also be configured to record a cell type. Examples of such cell types may be macro, micro, pico, femto, ect.

The user equipment may also be configured to record cell access information. For example, the user equipment may be configured to indicate whether a cell is fully or partially accessible or not to all user equipments. Examples of such information may be CSG cells, non-CSG, hybrid CSG, any restricted or barred cell, cell barred for specific operation/services etc, proximity; whether a cell is in proximity of CSG etc., frequency associated with the at least one cell, and/or timing information, e.g., SFN, associated with the at least one cell.

According to some of the example embodiments, the information associated with cell changing may be provided upon request or when configured (e.g., a configuration message may indicate which elements of the said information are to be provided). According to some example embodiments, the recordation of information may also be mandatory for certain measurements (e.g., for MDT measurements, for E-CID, OTDOA, UTDOA or other positioning measurements, for a measurement during which at least one cell change has occurred, etc.).

It should be appreciated that the user equipment trajectory information can be provided by the user equipment in any RRC state e.g. idle state, connected state, low activity states (e.g. CELL_PCH, URA_PCH, CELL_FACH states etc).

It should also be appreciated that all the examples of recorded cell information also be obtained by the user equipment for the neighbour cells associated with each serving/PCell while obtaining the cell change/trajectory information.

Figure 3:
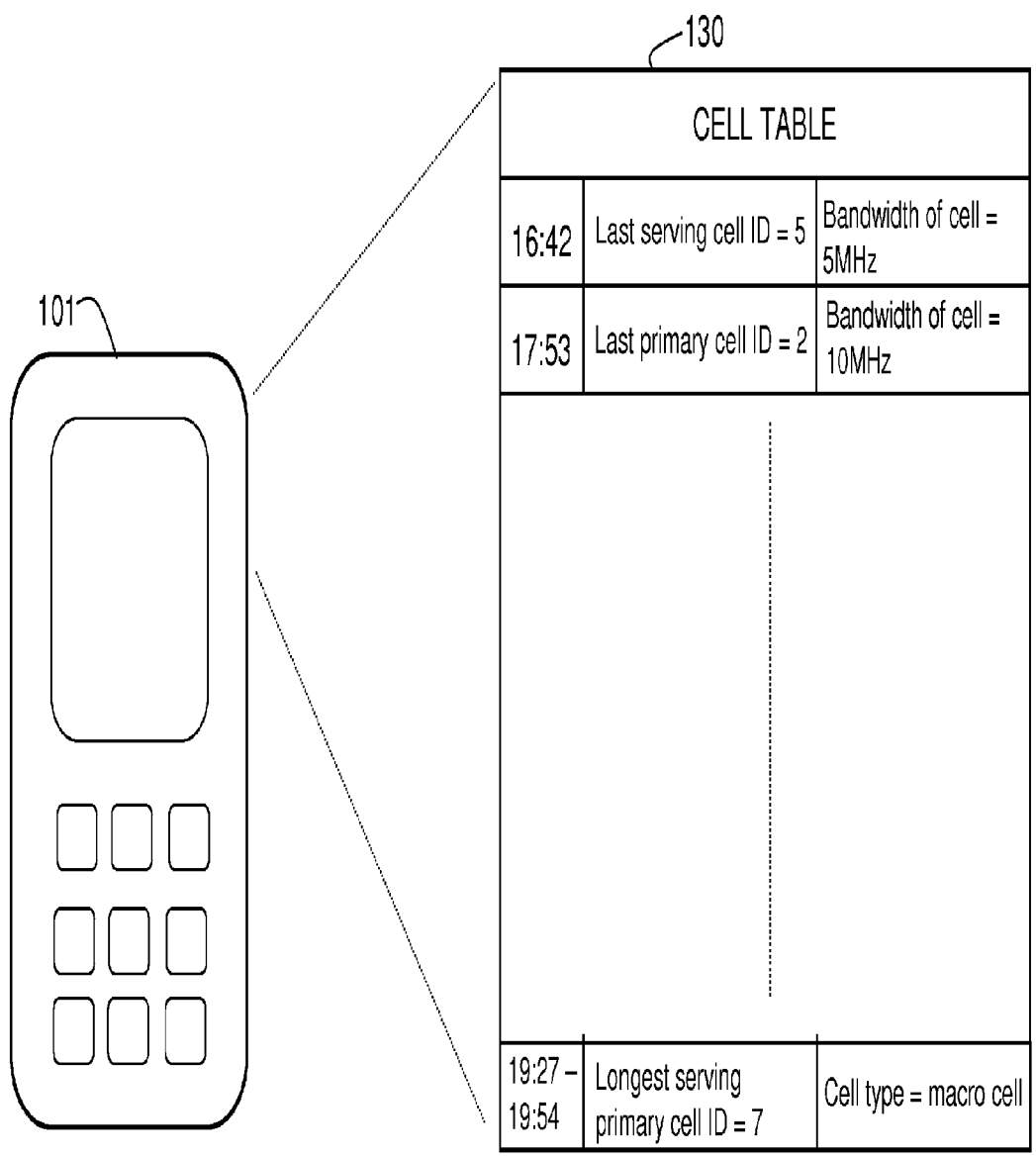
FIG. 3 is an illustrative example of a user equipment recordation, according to some of the example embodiments.

FIG. 3 illustrates an example of a recorded user equipment trajectory. In some example embodiments, the user equipment 101 may be configured to store the user equipment trajectory information internally, for example, in the form of a cell table 130. As shown, the cell table 130 may comprise any entries, where each entry may comprise any number of fields. In the example provided in FIG. 3, each entry may be time stamped, as described above. Furthermore, the table may comprise any number of different entry types. In the example provided in FIG. 3, the cell table 130 comprises a last serving cell ID, a first primary cell, and a longest serving primary cell ID entry.

It should be appreciated that the use of a cell table is used merely for explanation and any other form of recordation or listing may be utilized. Furthermore, the recordation techniques described above are also presented as examples. Any form of cell related information may be recorded and used for the management of radio resources.

User Equipment Behaviour During a Serving Cell/Primary Cell Change

According to some of the example embodiments,

A user equipment upon receiving a measurement configuration or scheme may take appropriate actions while taking into account the cell change during a measurement interval or during a configured interval. The cell change may occur due to various reasons e.g. handover, cell reselection, RRC re-establishment, RRC connection release with redirection to a target cell, PCell switching (aka PCell change or primary serving cell change) etc.

A few non-limiting examples are herein provided to illustrate the user equipment behaviour during serving cell/primary cell changes over a certain time period e.g. measurement period of OTDOA RSTD measurements, according to some of the example embodiments.

The OTDOA session can be of several seconds and thus HO can occur during the session. Without these requirements the OTDOA session can be aborted due to HO. This would require the positioning node to initiate a new session leading to wastage of previous measurements and leading to much longer overall delay. The problem becomes even more severe in an area with many small cells where the HW probability is high.

User Equipment Behaviour Under HO When Intra-frequency RSTD is Measured:

Consider the first example in which the user equipment is connected to its serving cell and it is configured by the positioning node to perform OTDOA intra-frequency and/or inter-frequency measurements. The user equipment may receive the OTDOA assistance data for performing RSTD measurements on cells which are in the assistance data. While the user equipment performs the RSTD measurements, the serving cell of the user equipment may change (e.g. due to HO). As an example the serving cell may change K times during a time period. All the K serving cells during the time period may not have the same system bandwidth. For example some cells have smaller BW (e.g. 15 RB) whereas others may have BW equal to 50 RB. The Positioning Reference Signal (PRS) BW of the cells in the OTDOA can be larger than, smaller than, or equal to the BW of the serving cells. For example assume PRS BW of all cells is 50 RBs. When the user equipment serving cell BW is greater than or equal to that of the PRS BW then the UE can measure RSTD on the entire PRS BW of the cell. Otherwise when the serving cell BW is smaller than the PRS BW then the UE can at most measure on the PRS BW equal to the serving cell BW.

Thus, according to some of the example embodiments, the following rules may be implemented, for example, when the user equipment performs RSTD measurements and the HO occurs. The examples may be applicable to both FDD and TDD.

Rules for an Intra-frequency RSTD Measurement Period:

If the intra-frequency handover occurs while intra-frequency RSTD measurements are being performed, the user equipment may complete the on-going OTDOA measurement session. However, in this case (i.e. when handover occurs) the RSTD measurement period over which the user equipment performs RSTD of cells which are in the assistance data may be longer than usual. This usual means when there is no handover. The reason is that the user equipment may not be able to measure the RSTD when user equipment is doing handover. Another reason is that the PRS signals over which the user equipment measures RSTD may collide or overlap (i.e. fully or partially) with the time instance when handover occurs. Another implicating factor is the bandwidth of the serving cell. It should also be noted that more than one handover may occur over the RSTD measurement period.

Hence as an example, the RSTD measurement period ($T_{RSTD\ IntraFreq,E-UTRAN,HO}$) can be expressed according to the following general expression as a function of the following parameters: $T_{RSTD\ IntraFreq,E-UTRAN,HO} = f(T_{RSTD\ IntraFreq,E-UTRAN}, K, T_{PRS}, T_{HO}, \ldots)$. One specific non-limiting example may be: $T_{RSTD\ IntraFreq,E-UTRAN,HO} = T_{RSTD\ IntraFreq,E-UTRAN} + K \times (T_{PRS} + T_{HO})$ ms, K is the number of times the intra-frequency handover occurs during $T_{RSTD\ IntraFreq,E-UTRAN,HO}$, $T_{PRS}$ is the cell-specific positioning sub-frame configuration period e.g. 1024 ms, $T_{RSTD\ IntraFreq,E-UTRAN,HO}$ is the time for doing intra-frequency RSTD measurements if no HO occurs, and $T_{HO}$ is the time during which the intra-frequency RSTD measurement may not be possible due to intra-frequency handover; it can be up to 45 ms.

Rules for Intra-frequency RSTD Accuracy:

Another aspect of the user equipment behaviour as indicated above is related to the serving cell BW while the user equipment performs the RSTD measurement on cells. If the user equipment traverses more than one serving cell (i.e. served by 2 or more cells) over the RSTD measurement period, then the serving cell BW may affect the accuracy of the RSTD measurements. The RSTD measurement accuracy is typically expressed in a basic time unit (Ts), e.g. in the order of +/−100 ns. The accuracy depends on factors such as PRS BW, number of PRS sub-frames etc. The serving cell BW may affect the bandwidth over which the user equipment can measure the RSTD, which is done on PRS, of the measured cell.

Therefore, as a general rule it may be pre-defined that if the user equipment is performing an RSTD measurement while the handover occurs then the user equipment may meet the RSTD measurement accuracy by taking into consideration at least the bandwidth (i.e. channel/system/transmission BW) of all its serving cells over the RSTD measurement period. According to another general rule it may be pre-defined that if the user equipment is doing RSTD measurement while the handover occurs then the user equipment may meet the RSTD measurement accuracy by taking into consideration at least the bandwidth (i.e. channel/system BW) of all its serving cells over the RSTD measurement period as well as the PRS BW of the measured cells.

More specifically, it may be pre-defined that the user equipment meets the RSTD measurement accuracy corresponding to the PRS bandwidth which is not larger than the minimum channel/system/transmission bandwidth of all the serving cells during the RSTD measurement $T_{RSTD\ IntraFreq,E-UTRAN,HO}$.

User Equipment Behaviour Under HO When Inter-frequency RSTD is Measured and Rules for Inter-frequency RSTD Measurement Period:

The user equipment behavior when inter-frequency or intra-frequency HO occurs while the user equipment does inter-frequency RSTD measurements is very similar to the user equipment behavior in case of intra-frequency HO when user equipment does intra-frequency HO (as explained above). For example, the inter-frequency RSTD delay can be longer than the usual inter-frequency RSTD delay. More specifically, the RSTD measurement period ($T_{RSTD\ InterFreqTDD,E-UTRAN,HO}$) can be according to the following expression: $T_{RSTD\ InterFreqTDD,E-UTRAN,HO} = T_{RSTD\ InterFreqTDD,E-UTRAN} + K \times (T_{PRS} + T_{HO})$ ms, where:

K is the number of times the inter-frequency or/and intra-frequency handover occurs during $T_{RSTD\ InterFreqTDD,E-UTRAN,HO}$, $T_{HO}$ is the time during which the inter-frequency RSTD measurement may not be possible due to inter-frequency handover; it can be up to 45 ms.

The inter-frequency measurements may be performed in gaps, which may be reconfigured if the HO occurs e.g. by new serving cell. Therefore additional delay due to gap reconfiguration may be needed e.g.

$$T_{RSTD\ InterFreqTDD,E-UTRAN,HO} = T_{RSTD\ InterFreqTDD,E-UTRAN} + K \times (T_{PRS} + T_{HO} + T_{gap\text{-}config}) \text{ms where}$$

$T_{gap\text{-}config}$ is the time to configure or reconfigure gaps for inter-frequency measurements; it can be up to 50 ms.

Rules for Inter-frequency RSTD Accuracy:

Similarly, the RSTD measurement accuracy may be affected by the serving cell BW. For example, if the inter-frequency over which the user equipment does RSTD measurements becomes intra-frequency then serving cell BW may affect the RSTD accuracy. Similarly, if the user equipment does not need gaps for measuring the inter-frequency over which the user equipment does RSTD measurements, then serving cell BW may affect the RSTD accuracy. Similarly, if the reference cell is on the serving carrier then the serving cell BW may affect the RSTD accuracy.

Therefore, as a general rule it may also be pre-defined that if the user equipment is doing inter-frequency RSTD measurement while the inter-frequency or intra-frequency handover occurs then the user equipment may meet the RSTD measurement accuracy by taking into consideration at least the bandwidth (i.e. channel/system/transmission BW) of all its serving cells over the RSTD measurement period.

According, to another general rule it may be pre-defined that if the user equipment is doing inter-frequency RSTD measurement while the inter-frequency or intra-frequency handover occurs, then the user equipment meets the RSTD measurement accuracy by taking into consideration at least the bandwidth (i.e. channel/system BW) of all its serving cells over the RSTD measurement period as well as the PRS BW of the measured cells. More specifically it may be pre-defined that the user equipment meets the RSTD measurement accuracy corresponding to the PRS bandwidth which is not larger than the minimum channel/system/transmission bandwidth of all the serving cells during the inter-frequency RSTD measurement.

User Equipmentbehaviour Under Primary Cell Change When RSTD is Measured:

If the user equipment is configured in carrier aggregation (e.g. at least with one secondary cell) and the primary cell is changed while user equipment is doing the RSTD measurements then the user equipmentbehaviour may also be defined. The behaviour in terms of RSTD measurement period and accuracy are very similar to that in case of HO as explained below with an example.

Rules for RSTD Measurement Period Under PCell Change in CA:

If the PCell is changed regardless whether the primary component carrier is changed or not while the RSTD measurements are being performed on cells belonging the primary component carrier (PCC) or the secondary component (SCC) carrier or on primary as well as on secondary component carriers then the user equipment completes the on-going OTDOA measurement session. The user equipment may also meet the OTDOA measurement and accuracy requirements for the primary or secondary component carrier or all carriers depending whether cells are measured on PCC, SCC or on both PCC and SCC. The total RSTD measurement period ($T_{RSTD,E-UTRAN,Pcell\_change}$) can be according to the following expression:

$T_{RSTD,E-UTRAN,Pcell\_change} = K \times (T_{PRS} + T_{Pcell\_change})$ ms, where K is the number of times the PCell is changed during $T_{RSTD,E-UTRAN,Pcell\_change}$, $T_{Pcell\_change}$ is the time during which the RSTD measurement may not be possible due to PCell change; it can be up to ms, and $T_{RSTD,E-UTRAN}$ corresponds to the E-UTRAN intra-frequency RSTD measurement period.

Rules for RSTD Measurement Accuracy Under PCell Change in CA:

The RSTD measurement accuracy may also depend upon the BW of all the PCell(s) during the RSTD measurement period. For example as a general rule it may be pre-defined that if the PCell is changed (regardless whether the primary carrier changes or not) while the user equipment is doing RSTD measurement when configured with at least one secondary cell (SCell) then the user equipment may meet the RSTD measurement accuracy by taking into consideration at least the bandwidth (i.e. channel/system/transmission BW) of all its PCell(s) over the RSTD measurement period. According to another general rule it may be pre-defined that if the user equipment is doing RSTD measurement while the PCell changes then the user equipment meets the RSTD measurement accuracy by taking into consideration at least the bandwidth (i.e. channel/system BW) of all its PCell(s) over the RSTD measurement period as well as the PRS BW of the measured cells.

More specifically, it may be pre-defined that the user equipment meets the RSTD measurement accuracy corresponding to the PRS bandwidth which is not larger than the minimum channel/system/transmission bandwidth of all the PCells during the RSTD measurement when configured with at least one SCell.

It should be appreciated that the modification or user equipment behaviour and/or a current measurement scheme may be based on the above identified rules and/or cell information which is recorded and stored by the user equipment, as described under the previous heading entitled 'Recordation of user equipment trajectory'.

Using the Information Associated with the Cell Change

The information associated with cell changing may be collected, stored and used by different nodes for different purposes, e.g., measurement or general resource management. Non-limiting examples of nodes which may obtain the cell change information of the user equipment or of wireless terminal or of a mobile relay are:

Radio network node e.g., eNode B, radio network controller, base station, relay node, donor node serving relay, mobile relay node etc.

Positioning node e.g. E-SMLC in LTE

Network nodes in general e.g. MDT node, SON node, core network node (e.g. MME in LTE), OSS node, O&M node, network management and planning node etc.

Test equipment nodes/system simulator e.g. obtaining information during a test to verify that the user equipment or wireless terminal or of mobile relay are compliant to the pre-defined rule, signalling and requirements associated with the cell change of the user equipment.

The above nodes may collect the information associated with cell changing for different user equipments and create statistics, for example, over time and/or for a specific group of user equipments. In general the acquired cell change information can be used by the acquiring node for the 'monitoring, planning and management' of the network. More specifically the above nodes may use the results/statistics for one or more of the following tasks or functions which are provided as a non-limiting example:

Positioning (e.g., enhancing RFPM, pattern matching or AECID),

UE tracking e.g. to know the typical UE path or subscriber travel route,

SON; automated tuning of network parameters, addition of new cells/removal of existing cells, upgrading of existing cells (e.g. extending cell BW or PRS BW etc), MDT; planning of network in general such as installation of new BS sites, update of cell type (e.g. increase or decrease of BS max output power) etc., HO optimization; improve parameters related to the handover e.g. HO margin, time to trigger CA configuration optimization.

Applicability to Test Case and Test Equipment

User equipment configuration (or any wireless device e.g. mobile relay) may also be configured in the test equipment (TE) node (aka system simulator (SS)). The TE or SS may implement all configuration methods related to cell change in order to be able to configure the user equipment for testing. The purpose of testing is to verify that the user equipment is compliant to the pre-defined rules, protocols, signalling and/or requirements associated with the cell change feature e.g. tracking and logging of the user equipment trajectory during the cell change.

The TE or SS Will Also Be Capable of:

Receiving the UE measurement results associated with the cell change

Analysing the received results e.g. comparing the with the reference results. The reference can be based on the pre-defined requirements or UE behaviour.

Example User Equipment Configuration

Figure 4:
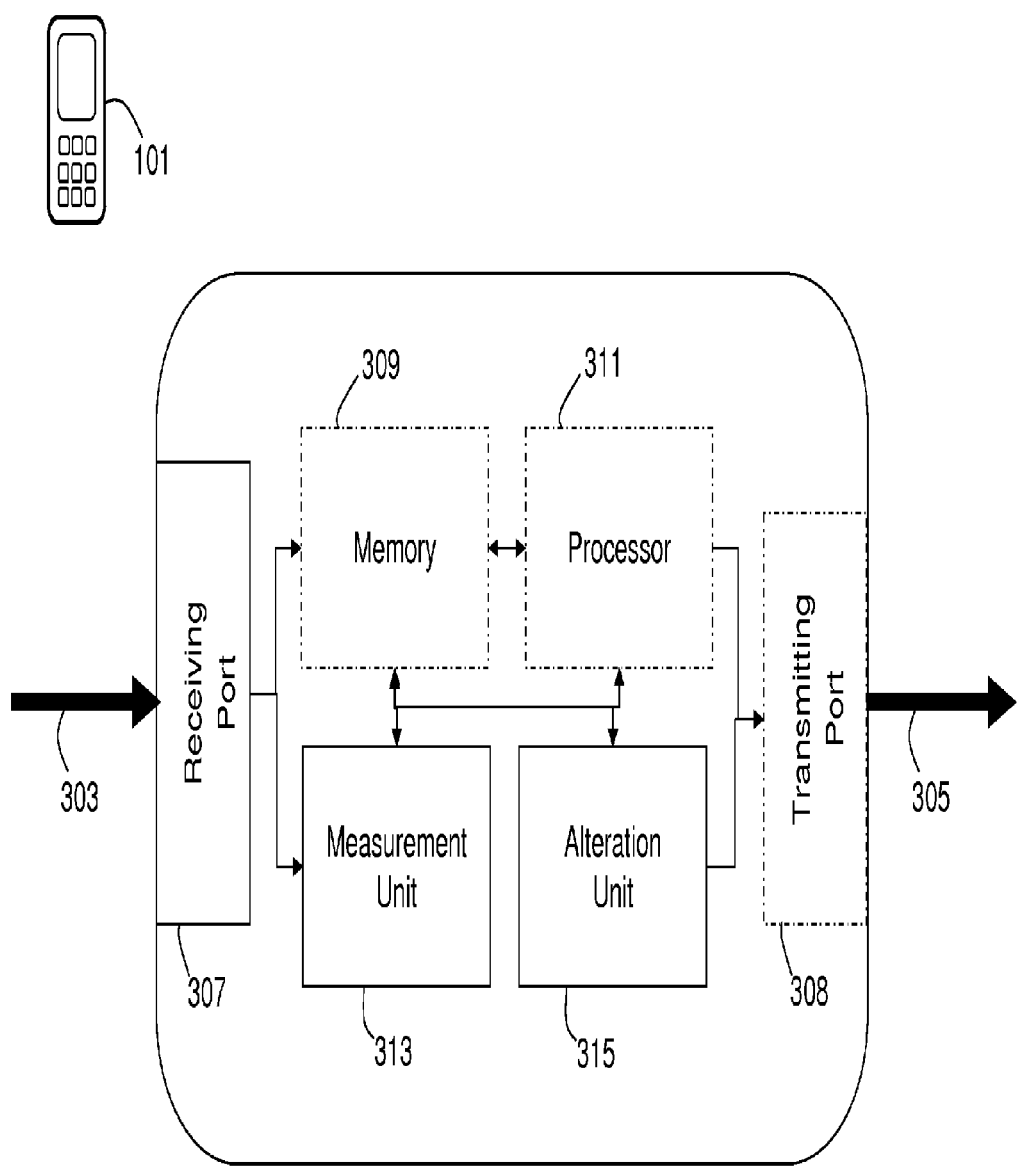
FIG. 4 is a schematic of a user equipment, according to some of the example embodiments.

FIG. 4 illustrates an example of a user equipment node 101, according to some of the example embodiments. The user equipment 101 may comprise any number of communication ports, for example a receiving port 307 and a transmitting port 308. The communication ports may be configured to receive and transmit any form of communications data 303 and 305, respectively. It should be appreciated that the user equipment 101 may alternatively comprise a single transceiver port. It should further be appreciated that the communication or transceiver port may be in the form of any input/output communications port known in the art.

The user equipment 101 may further comprise at least one memory unit 309 that may be in communication with the communication ports 307 and/or 308. The memory unit 309 may be configured to store received, transmitted, and/or measured data of any kind and/or executable program instructions. The memory unit 309 be any suitable type of computer readable memory and may be of a volatile and/or non-volatile type.

The user equipment 101 may also comprise a measurement unit 313 which may be configured to perform measurements. The user equipment 101 may further comprise an alteration unit 315 that may be configured to alter aspects of measurements performed by the user equipment (e.g., a duration of measurement time and/or a measurement bandwidth). The user equipment 101 may further comprise a general processing unit 311.

It should be appreciated that the measurement unit 313, alteration unit 315, and/or the processing unit 311 may be any suitable type of computation unit, e.g. a microprocessor, digital signal processor (DSP), field programmable gate array (FPGA), or application specific integrated circuit (ASIC), or any form of processing circuitry. It should also be appreciated that the measurement unit 313, alteration unit 315, and/or the processing unit 311 need not be comprised as separate units. The measurement unit 313, alteration unit 315, and/or the processing unit 311 may be comprised as a single computational unit or any number of units. It should also be appreciated that the user equipment 101 may be a mobile phone, a Personal Digital Assistant (PDA), or any other LTE network unit capable to communicate with a base station over a radio channel.

Example Network Node Configuration

Figure 5:
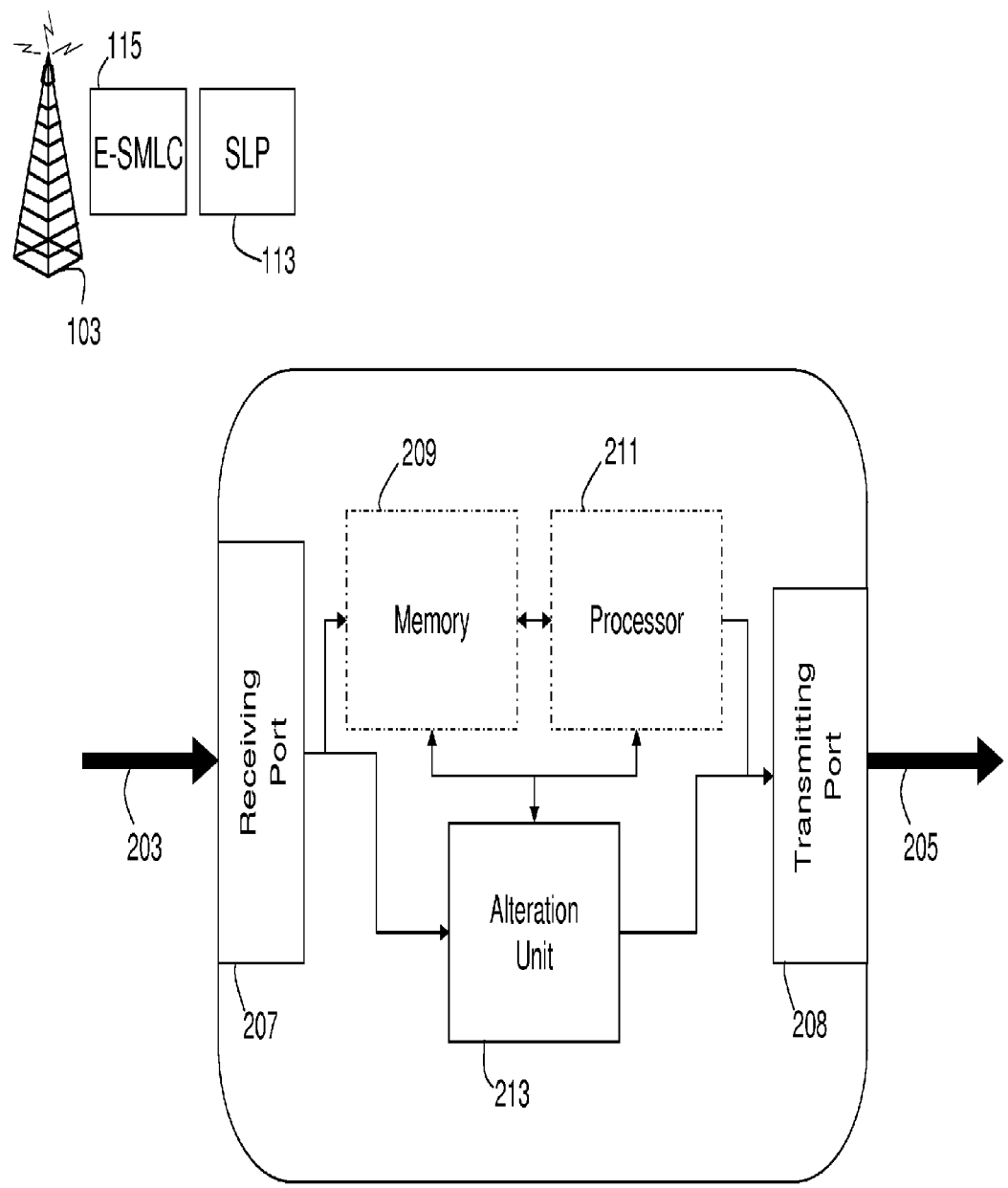
FIG. 5 is a schematic of a network node, according to some of the example embodiments.

FIG. 5 provides an illustrative example of a network node configuration, according to some of the example embodiments. In some example embodiments, the network node may be a radio base station 103, an E-SMLC node 115, or a SLP node 113.

The network node may comprise any number of communication ports, for example a receiving port 207 and a transmitting port 208. The communication ports may be configured to receive and transmit any form of communications data 203 and 205, respectively. It should be appreciated that the network node may alternatively comprise a single transceiver port. It should further be appreciated that the communication or transceiver port may be in the form of any input/output communications port known in the art.

The network node may further comprise at least one memory unit 209 that may be in communication with the communication ports 207 and/or 208. The memory unit 209 may be configured to store received, transmitted, and/or measured data of any kind and/or executable program instructions. The memory unit 209 be any suitable type of computer readable memory and may be of a volatile and/or non-volatile type.

The network node may also comprise an alteration unit 213 that may be configured to determine instructions for altering aspects of a user equipment measurement (e.g., altering a duration of measurement time and/or a measurement bandwidth). The alteration unit 213 may also be configured to provide a user equipment with information relating to a cell change. The network node may further comprise a general processing unit 311.

It should be appreciated that the alteration unit 213 and/or the processing unit 211 may be any suitable type of computation unit, e.g. a microprocessor, digital signal processor (DSP), field programmable gate array (FPGA), or application specific integrated circuit (ASIC). It should also be appreciated that the alteration unit 213 and/or the processing unit 211 need not be comprised as separate units. The alteration unit 213 and/or the processing unit 211 may be comprised as a single computational unit or any number of units.

Example User Equipment Operations

Figure 6:
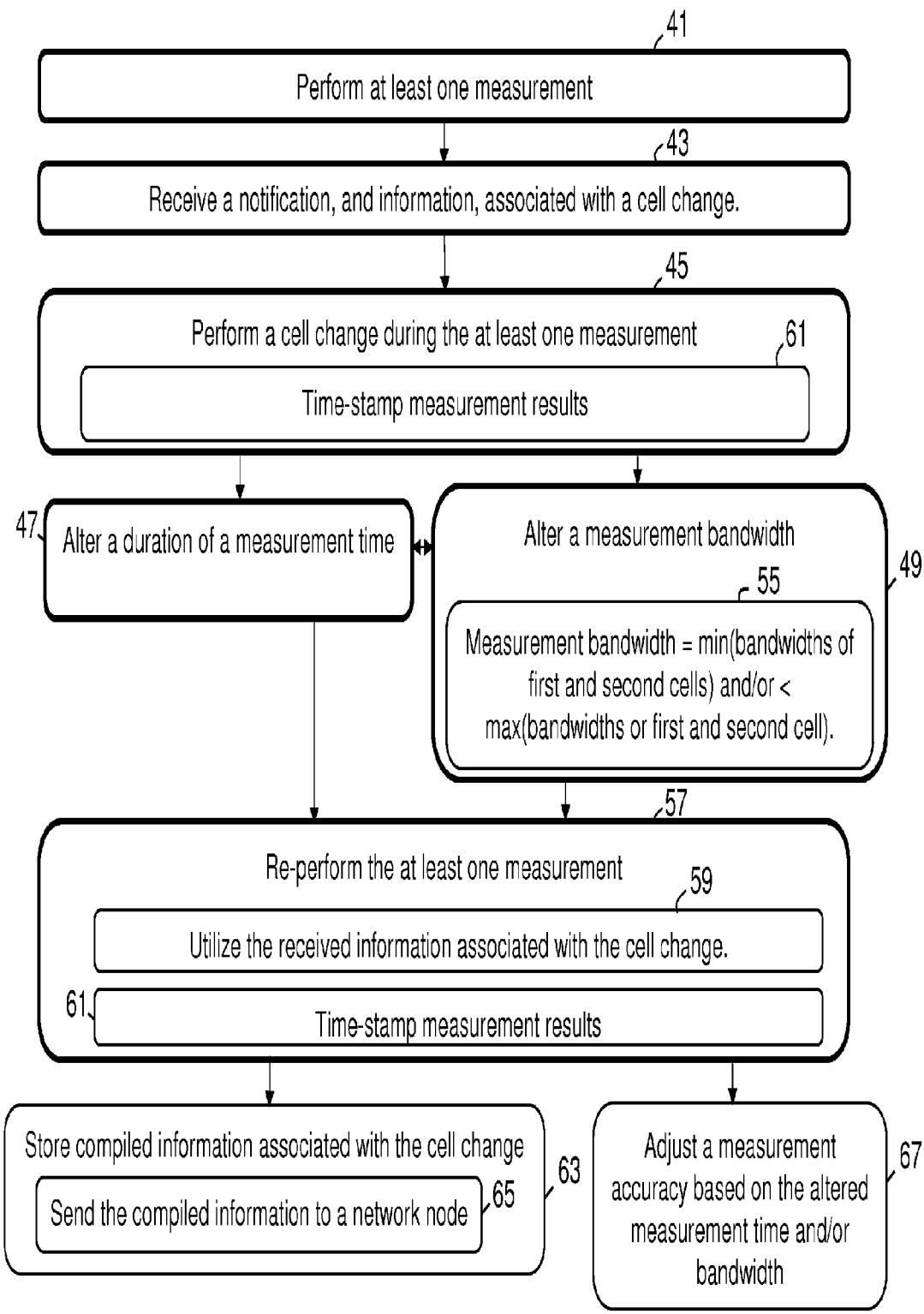
FIG. 6 is a flow diagram depicting example operations which may be performed by the user equipment of FIG. 4.

FIG. 6 illustrates example operations which may be performed by the user equipment 101 of FIG. 3, according to some of the example embodiments. The example operations are directed towards the handling of a cell change. A cell change refers to a user equipment 101 changing the cell of which the user equipment is currently situated, e.g., a cell change from a first or current cell to a second cell. It should be appreciated that the network node may be a base station 103, a E-SMLC node 115, of a SLP node 113.

Operation 41

The user equipment 101 is configured to perform 41 at least one measurement. The measurement unit 313 is configured to perform the at least one measurement. According to some of the example embodiments, the at least one measurement may be a RSTD measurement for OTDOA positioning, a RSRP, a RSRQ, and/or a user equipment Rx–Tx time difference measurement.

Operation 43

The user equipment 101 is further configured to receive 43, from a network node, a notification of, and information associated with, a cell change from a first cell to a second cell. The receiving port 307 is configured to receive the notification of, and the information associated with, the cell change.

According to some example embodiments, the cell change may be a serving cell change, a serving cell set change, an active cell set change, a PCell change on a same frequency carrier, or a cell change due to carrier switching. According to some of the example embodiments, the cell change may be a result of any one of a handover procedure; cell reselection; Radio Resource Control, RRC, connection re-establishment; RRC connection release with redirection to a target cell; primary cell, PCell, change on same frequency as primary component carrier, PCC, in a multi-carrier system; PCell change due to change of PCC in a multi-carrier system; serving cell set change in a multi-carrier system, or active cell set change in a multi-carrier system. According to some of the example embodiments, the first cell may be a serving cell during a first period, and the second cell may be a serving cell during a second period, where the second period occurs after the first period in time.

According to some example embodiments, the received information associated with the cell change may comprise a type of measurement to be performed, a type of cell identification for reporting and/or bandwidth information. According to some of the example embodiments, the received notification and/or received information associated with the cell change is received upon request and/or is received periodically based on a configuration which may be programmable.

Operation 45

The user equipment is also configured to perform 45 the cell change during the at least one measurement. The measurement unit 313 is configured to perform the cell change during the at least one measurement.

Operation 47

The user equipment is also configured to alter 47 a duration of a measurement time over which the at least one measurement is performed. The alteration unit 315 is configured to alter the duration of the measurement time over which the at least one measurement is performed.

It should be appreciated that the alteration 47 may be performed based on rules associated with the user equipment. For example, the rules associated with the user equipment may be pre-defined rules which are provided within the user equipment. It should be further appreciated that such rules may be adjustable or user programmable. Furthermore, it should be appreciated that such rules may also be provided by the network node along with the information associated with the cell change and/or the received notification.

Operation 49

The user equipment is also configured to alter 49 a measurement bandwidth of the at least one measurement, wherein the altering is based on associated bandwidths of the first and second cells. The alteration unit 315 is configured to alter the measurement bandwidth of the at least one measurement, wherein the altering is based on associated bandwidths of the first and second cells.

It should be appreciated that the alteration 49 may be performed based on rules associated with the user equipment. For example, the rules associated with the user equipment may be pre-defined rules which are provided within the user equipment. It should be further appreciated that such rules may be adjustable or user programmable. Furthermore, it should be appreciated that such rules may also be provided by the network node along with the information associated with the cell change and/or the received notification.

Example Operation 55

According to some of the example embodiments, the altering 49 may further comprise altering 55 the measurement bandwidth to at least one of a minimum of bandwidths of the first and second cells, and/or a bandwidth which is not larger than bandwidths of the first and second cells. The alteration unit 315 may be configured to alter the measurement bandwidth to at least one of a minimum of bandwidths of the first and second cells, and/or a bandwidth which is not larger than bandwidths of the first and second cells.

According to some of the example embodiments, the bandwidth of the first or second cell may be the channel bandwidth or a transmission bandwidth. According to some of the example embodiments, the measurement bandwidth may be the bandwidth of reference signals to be measured. According to some of the example embodiments, the reference signals may be Positioning Reference Signals (PRS) and the measurement bandwidth may be a PRS bandwidth.

Operation 57

The user equipment is also configured to complete 57 the at least one measurement based on the altered duration of measurement time and the altered measurement bandwidth. The measurement unit 313 may be configured to complete the at least one measurement based on the altered duration of measurement time and the altered measurement bandwidth.

Example Operation 61

According to some of the example embodiments, the user equipment may be configured to time stamp 61 results of the at least one measurement. The measurement unit 313 may be configured to time stamp the results of the at least one measurement.

Example Operation 63

According to some of the example embodiments, the user equipment may be configured to store 63 compiled information associated with the cell change of the first cell to the second cell, where the compiled information is provided by the user equipment. The memory unit 309 may be configured to store the compiled information associated with the cell change of the first cell to the second cell, where the compiled information is provided by the user equipment.

According to some of the example embodiments, the compiled information associated with the change of the first cell to the second cell may comprise user equipment trajectory information. The user equipment trajectory data may comprise an ordered or non-ordered list of cell identities of cells which the user equipment is connected to and/or camped during a period of time, and/or cell information. The cell information may comprise a carrier frequency of each serving cell, system bandwidth, measurement bandwidth and/or a cell type.

Example Operation 65

According to some of the example embodiments, the user equipment may be configured to send 65 the compiled information to a network node or another user equipment. The transmitting port 308 may be configured to send the compiled information to the network node or another user equipment.

Example Operation 67

According to some of the example embodiments, the user equipment may be configured to adjust 67 a measurement accuracy of the at least one measurement with respect to the altered duration of measurement time and the altered measurement bandwidth. The alteration unit 315 may be configured to adjust the measurement accuracy of the at least one measurement with respect to the altered duration of measurement time and the altered measurement bandwidth.

Example Network Node Operations

Figure 7:
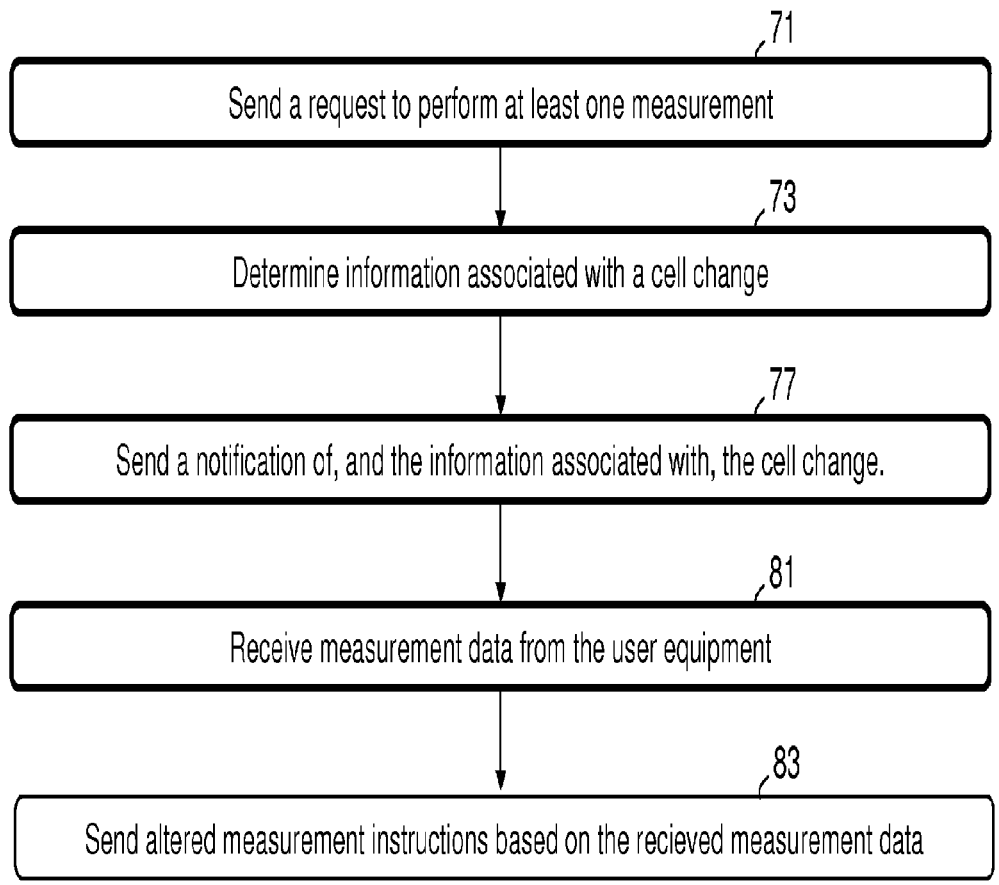
FIG. 7 is a flow diagram depicting example operations which may be performed by the network node of FIG. 5.

FIG. 7 illustrates example operations which may be performed by the network node of FIG. 4, according to some of the example embodiments. The example operations are directed towards handling a cell change for a user equipment. A cell change refers to a user equipment 101 changing the cell of which the user equipment is currently situated, e.g., a cell change from a first or current cell to a second cell. It should be appreciated that the network node may be a base station 103, a E-SMLC node 115, of a SLP node 113.

Operation 71

The network node is configured to send 71, to a user equipment, a request to perform at least one measurement. The transmitting port 208 is configured to configured to send, to the user equipment, the request to perform at least one measurement.

According to some of the example embodiments, the at least one measurement may be a RSTD measurement for OTDOA positioning, a RSRP, a RSRQ, and/or a user equipment Rx–Tx time difference measurement.

Operation 73

The network node is also configured to determine 73 information associated with a cell change from a first cell to a second cell. The information associated with the cell change comprises alteration instructions for altering a user equipment measurement time and measurement bandwidth in a presence of the cell change. The alteration unit 213 is configured to determine the information associated with the cell change from the first cell to the second cell.

According to some example embodiments, the cell change may be a serving cell change, a serving cell set change, an active cell set change, a PCell change on a same frequency carrier, or a cell change due to carrier switching. According to some of the example embodiments, the cell change may be a result of any one of a handover procedure; cell reselection; Radio Resource Control, RRC, connection re-establishment; RRC connection release with redirection to a target cell; primary cell, PCell, change on same frequency as primary component carrier, PCC, in a multi-carrier system; PCell change due to change of PCC in a multi-carrier system; serving cell set change in a multi-carrier system, or active cell set change in a multi-carrier system. According to some of the example embodiments, the first cell may be a serving cell during a first period, and the second cell may be a serving cell during a second period, where the second period occurs after the first period in time.

Operation 75

The network node is also configured to send 75, to the user equipment, a notification of, and information associated with, the cell change. The information associated with the cell change comprises instructions for altering. The transmitting port 208 is configured to send, to the user equipment, the notification of, and the information associated with, the cell change.

According to some of the example embodiments, the instructions for altering may comprise instructions for determining the altered measurement time and/or the altered measurement bandwidth, and the instructions for altering may be based on pre-determined rules. According to some of the example embodiments, the instructions for altering may comprise instructions for altering a measurement bandwidth to at least one of a minimum of bandwidths of the first and second cells, and/or a bandwidth which is not larger than the bandwidths of the first and second cells. In some example embodiments, the bandwidth of the first or second cell is the channel bandwidth or the transmission bandwidth. In some example embodiments, the measurement bandwidth is the bandwidth of reference signals to be measured. In some example embodiments, the reference signals are Positioning Reference Signals (PRS) and the measurement bandwidth is a PRS bandwidth.

Operation 81

The network node is also configured to receive 81, from the user equipment, measurement data, where the measurement data comprises at least one other measurement performed over the altered duration of measurement time and the altered measurement bandwidth. The altered duration of measurement time and the altered measurement bandwidth are based on bandwidths associated with the first and second cells. The receiving port 207 is configured to receive, from the user equipment, the measurement data.

Example Operation 83

According to some of the example embodiments, the network node may be configured to send 83 altered measurement instructions based on received measurement data. The transmitting port 208 may be configured to send the altered measurement instructions based on the received measurement data.

According to some of the example embodiments, the altered measurement instructions may comprise instructions for adjusting a measurement accuracy of the at least one measurement with respect to the altered duration of the measurement time and the altered measurement bandwidth.

CONCLUSION

The embodiments described herein are not limited to a specific measurement, unless clearly stated. The signalling described in the example embodiments is either via direct links (protocols or physical channels) or logical links (e.g. via higher layer protocols and/or via one or more network nodes). For example, in LTE in the case of signalling between E-SMLC and LCS Client the positioning result may be transferred via multiple nodes (at least via MME and/or GMLC).

Although the description is mainly given for a user equipment it should be understood by the skilled in the art that "user equipment" is a non-limiting term which means any wireless device or node typically capable of receiving in DL and transmitting in UL (e.g. PDA, laptop, mobile, sensor, fixed relay, mobile relay or even a radio base station, e.g. femto base station). The example embodiments may apply for non-CA UE or both for user equipments capable and not capable of performing inter-frequency measurements without gaps, e.g. also including user equipments capable of carrier aggregation.

Positioning node described in different embodiments is a node with positioning functionality. For example, for LTE it may be understood as a positioning platform in the user plane (e.g., SLP in LTE) or a positioning node in the control plane (e.g., E-SMLC in LTE). SLP may also consist of SLC and SPC, where SPC may also have a proprietary interface with E-SMLC. In a testing environment, at least positioning node may be simulated or emulated by test equipment.

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or muti-RAT node. A multi-RAT node may comprise a node with co-located RATs or supporting multi-standard radio (MSR) or a mixed radio node.

A coordinating node coordinating other network or radio network nodes and/or receiving/transmitting the information or coordination messages associated with cell change may be present in the network. Example nodes that may take the coordinating node role, at least in part, are SON node, MDT node, positioning node, O&M node, etc.

The example embodiments are not limited to LTE, but may apply with any RAN, single- or multi-RAT. Some other RAT examples are LTE-Advanced, UMTS, HSPA, GSM, CDMA2000, HRPD, WiMAX, and WiFi.

The foregoing description of the example embodiments have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that any of the example embodiments presented herein may be used in conjunction, or in any combination, with one another.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Some example embodiments may comprise a portable or non-portable telephone, media player, Personal Communications System (PCS) terminal, Personal Data Assistant (PDA), laptop computer, palmtop receiver, camera, television, and/or any appliance that comprises a transducer designed to transmit and/or receive radio, television, microwave, telephone and/or radar signals.

The various example embodiments described herein are described in the general context of method steps or processes, which may be implemented in one aspect by a computer program product, embodied in a computer-readable medium, including computer-executable instructions, such as program code, and executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Furthermore, it should be appreciated that the example embodiments presented herein may be used in any combination with one another. Accordingly, although specific terms are employed, they are used in a generic and descriptive sense only and not for purposes of limitation, the scope of the embodiments being defined by the following claims.

The invention claimed is:

1. A method in a user equipment for handling a cell change, the user equipment being comprised in a wireless communications network, the method comprising:
   performing at least one measurement; wherein the at least one measurement is a Reference Signal Time Difference, RSTD, measurement;
   receiving from a network node, a notification of, and information associated with, the cell change from a first cell to a second cell;
   performing the cell change during the at least one measurement;
   altering a duration of a measurement time over which the at least one measurement is performed;
   altering a measurement bandwidth of the at least one measurement, wherein the altering is based on associated bandwidths of the first and second cells; and
   completing the at least one measurement based on the altered duration of measurement time and the altered measurement bandwidth.

2. The method of claim 1, wherein the cell change of the first cell to the second cell is a result of any of a handover procedure, cell reselection, Radio Resource Control (RRC) connection re-establishment, RRC connection release with redirection to a target cell, primary cell (PCell) change on same frequency as primary component carrier (PCC) in a multi-carrier system, PCell change due to change of PCC in a multi-carrier system, serving cell set change in a multi-carrier system, or active cell set change in a multi-carrier system.

3. The method of claim 1, wherein the first cell is a serving cell during a first period, and the second cell is a serving cell during a second period, wherein the second period occurs after the first period in time.

4. The method of claim 1, wherein the received information associated with the cell change comprises any one or a combination of: a type of measurement to be performed, a type of cell identification for reporting, and bandwidth information.

5. The method of claim 1, further comprising storing compiled information associated with the cell change of the first cell to the second cell, said compiled information being provided by the user equipment.

6. The method of claim 5, wherein the compiled information associated with the change of the first cell to the second cell comprises user equipment trajectory information, said user equipment trajectory data comprising an ordered or non-ordered list of cell identities of cells which the user equipment is connected to and/or camped during a period of time, and/or cell information, said cell information comprising a carrier frequency of each serving cell, system bandwidth, measurement bandwidth and/or a cell type.

7. The method of claim 5, further comprising sending the compiled information to a network node or another user equipment.

8. The method of claim 1, wherein the received notification and/or received information associated with the cell change is received upon request and/or is received periodically based on a configuration.

9. The method of claim 1, wherein the completing further comprises utilizing the received information associated with the cell change in the at least one measurement as the at least one measurement is on-going.

10. The method of claim 1, wherein performing and/or the completing the at least one measurement further comprises timing stamping results of the at least one measurement.

11. The method of claim 1, wherein the altered duration of measurement time and the altered bandwidth are based on at least one rule provided in the received notification and/or information associated with the change of the first cell to the second cell.

12. A user equipment for handling a cell change, the user equipment being comprised in a wireless communications network, the user equipment comprising:
   a measurement unit performing at least one measurement; wherein the at least one measurement is a Reference Signal Time Difference, RSTD, measurement;
   a receiving port configured to receive, from a network node, a notification of, and information associated with, the cell change from a first cell to a second cell;
   the measurement unit performing the cell change during the at least one measurement; and
   an alteration unit altering a duration of a measurement time over which the said at least one measurement is performed, and a measurement bandwidth of the at least one measurement based on associated bandwidths of the first and second cells; and
   the measurement unit completes the at least one measurement based on the altered duration of measurement time and the altered measurement bandwidth.

* * * * *